(No Model.)

J. B. RATHBUN.
PNEUMATIC TIRE FOR VEHICLES.

No. 549,611. Patented Nov. 12, 1895.

Witnesses:
John Becker.
William Schultz.

Inventor:
James B. Rathbun
by his attorneys
Roeder & Briesen

UNITED STATES PATENT OFFICE.

JAMES B. RATHBUN, OF NEW YORK, N. Y.

PNEUMATIC TIRE FOR VEHICLES.

SPECIFICATION forming part of Letters Patent No. 549,611, dated November 12, 1895.

Application filed January 25, 1895. Serial No. 536,197. (No model.)

*To all whom it may concern:*

Be it known that I, JAMES B. RATHBUN, of New York city, New York, have invented an Improved Pneumatic Tire for Vehicles, of which the following is a specification.

This invention relates to an improvement upon Patent No. 488,494, granted to A. T. Brown and G. F. Stillman December 20, 1892, for an improved tire, the object of my invention being to so construct the rim that one of its edges forms a permanent connection between the tire and the rim. In this way the manipulation of securing or removing the tire is not only greatly simplified, but the tire need only be detached at one of its edges when access to the inflation-tube is desired.

Figure 1:
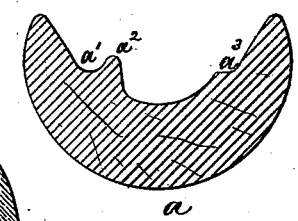
Figure 3:
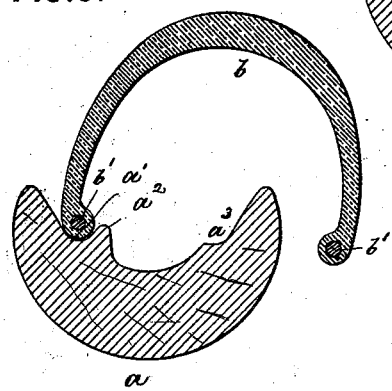
Figure 2:
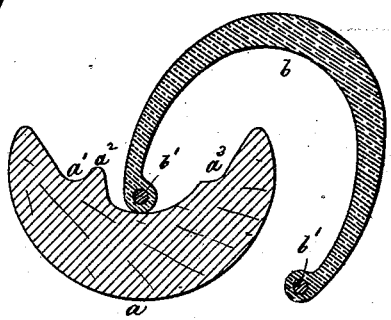
Figure 4:
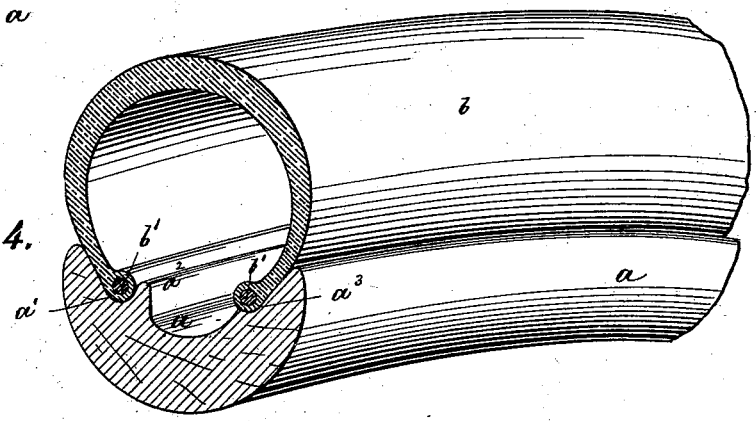

In the accompanying drawings, Figure 1 is a cross-section of a rim provided with my improvement. Figs. 2 and 3 are similar sections showing consecutive stages of putting on the tire. Fig. 4 is a perspective view showing the tire in place.

The letter $a$ represents a metal or wooden rim made of the usual concave form in cross-section. Along one edge of this rim I form a channel $a'$, which I term the "locking-seat," and which is provided along its inner edge with the ridge or flange $a^2$ to form a deep groove, which will secure the tire-flange against lateral displacement. At the other edge of the rim is formed a shoulder $a^3$, which permits an inner movement of the tire-flange, and which I term the "open seat." The tire $b$ is provided with the wires $b'$ incorporated within its two edges, as shown in the patent above referred to.

The elastic bead formed around the wire $b'$ by the enlarged edge of the tire $b$ should be of less diameter than the diameter of the flange $a^2$. In this way the bead, after being crowded over the flange $a^2$, will be firmly seated within the groove $a'$, and thus the tire will be permanently attached to the rim along one of its edges. After the tire is thus attached at one edge the usual inflation-tube is filled and the free edge of the tire is fitted upon the shoulder $a^3$, Fig. 4, when the operation will be completed. If at any time it should be desired to obtain access to the inflation-tube, the tire is simply detached along the shoulder $a^3$, while it remains attached to the rim along the groove $a'$. In this way the subsequent reattachment of the tire is greatly facilitated.

The advantages connected with my improvement are that the tire can be more easily and more truly seated and that it can be detached along one edge without affecting its connection at the other edge.

What I claim is—

The combination of a concave rim having a seat $a^3$, a groove $a'$, and a flange $a^2$, along the inner edge of said groove, with an elastic tire having beaded and reinforced edges, all being so constructed that the diameter of the beads is less than the diameter of the flange $a^2$, substantially as specified.

JAMES B. RATHBUN.

Witnesses:
    F. V. BRIESEN,
    WILLIAM SCHULZ.